United States Patent [19]

Gotou

[11] Patent Number: 4,821,168
[45] Date of Patent: Apr. 11, 1989

[54] CONTROL SYSTEM WITH IMPROVED ROBUSTNESS TO DISTURBANCES

[75] Inventor: Makoto Gotou, Nishinomiya, Japan

[73] Assignee: Matsushita Electric Industrial Co., Ltd., Osaka, Japan

[21] Appl. No.: 917,498

[22] Filed: Oct. 10, 1986

[30] Foreign Application Priority Data

Oct. 15, 1985 [JP] Japan ................................ 60-229141
Oct. 15, 1985 [JP] Japan ................................ 60-229143
Oct. 15, 1985 [JP] Japan ................................ 60-229144

[51] Int. Cl.⁴ ............................................. G06F 15/00
[52] U.S. Cl. .................................... 364/183; 318/317; 318/329; 318/345 E; 364/161; 364/174
[58] Field of Search ............... 364/183, 174, 162, 161; 318/329, 345 E, 311, 312, 317

[56] References Cited

U.S. PATENT DOCUMENTS

| | | | |
|---|---|---|---|
| 4,250,544 | 2/1981 | Alley | 364/183 |
| 4,371,819 | 2/1983 | Kaufmann | 318/329 |
| 4,376,970 | 3/1983 | Ilseman et al. | 364/183 |
| 4,396,975 | 8/1983 | Kurakake | 364/161 |
| 4,415,966 | 11/1983 | Herzog | 364/161 |
| 4,577,271 | 3/1986 | Jones et al. | 364/183 |

FOREIGN PATENT DOCUMENTS

56-57173 10/1982 Japan ................................ 364/161
82/02962 9/1982 PCT Int'l Appl. ................ 364/183

Primary Examiner—Jerry Smith
Assistant Examiner—Allen MacDonald
Attorney, Agent, or Firm—Wenderoth, Lind & Ponack

[57] ABSTRACT

A control system has a detector for obtaining a detected signal corresponding to a controlled variable of a controlled system and a controller for supplying the controlled system with a control signal corresponding to the detected signal. The controller includes an error circuit for producing an error signal corresponding to the detected signal, a storage circuit having a plurality of stored values corresponding to the error signal, and an output circuit for producing the control signal by mixing the error signal and one or more stored values of the storage circuit. The storage circuit renews the stored values sequentially and periodically with a value corresponding to a mixed value of the error signal and a set of N stored values, the N stored values having been renewed at intervals of L renewing cycle periods, where each of N and L is an integer at least equal to 2. Preferably, a microprocessor executes the tasks of the error circuit, the storage circuit and the output circuit.

36 Claims, 8 Drawing Sheets

CONTROL SYSTEM WITH IMPROVED ROBUSTNESS TO DISTURBANCES

BACKGROUND OF THE INVENTION

1. Field of the Invention

This invention relates to a control system, and more particularly, to a control system required to have a good robustness to disturbances, such as a control system for a motor.

2. Description of the Prior Art

In conventional control systems, a PI controller (Proportional-Integral controller) has been widely used in order to improve the robustness to disturbances, or to suppress the influences of disturbances. Recently, the PI controller can provide a digital control using a microprocessor. For example, a digital PI controller using a microprocessor for controlling the speed of a DC motor is disclosed in "Digital Control Systems", chapter 14, section 14.4, pp 689–694, written by Benjamin C. Kou and published as Holt-Saunders International Editions.

The PI controller, either analog or digital, can improve the robustness to disturbances more at lower frequencies. However, the recent requirement to improve the robustness to disturbances has become more and more severe in some applications. For example, a control system for controlling the speed of a capstan motor in a video tape recorder requires a highly improved robustness to torque disturbances, because the size and the inertia of the capstan motor have been greatly minimized in recent years.

SUMMARY OF THE INVENTION

It is an object of the present invention to provide a control system with an improved robustness to disturbances, that is, an improved ability to suppress the influences of disturbances.

It is another object of the present invention to provide a control system for a motor with an improved robustness to torque disturbances.

These objects are achieved according to the present invention by providing a control system comprising:

a detector for producing a detected signal indicative of a controlled variable of a controlled system;

an error signal generator for producing an error value from the detected signal;

a storage circuit for renewing a plurality of stored values stored therein sequentially and periodically at substantially constant renewing intervals each by a value having information of a first mixed value obtained by mixing the error signal with at least a set of N stored values of the plurality of stored values, the set of N stored values having been renewed at intervals of L renewing cycles, where each of N and L is an integer at least equal to 2; and an output circuit for producing a control signal from a second mixed value obtained by mixing the error signal with one or more of the stored values, and for supplying the controlled system with the control signal so as to control the controlled variable of the controlled system.

BRIEF DESCRIPTION OF THE DRAWINGS

These and other objects, features and advantages of the present invention will become more apparent from the following detailed description taken with the accompanying drawings in which.

DESCRIPTION OF THE PREFERRED EMBODIMENTS

Figure 1:
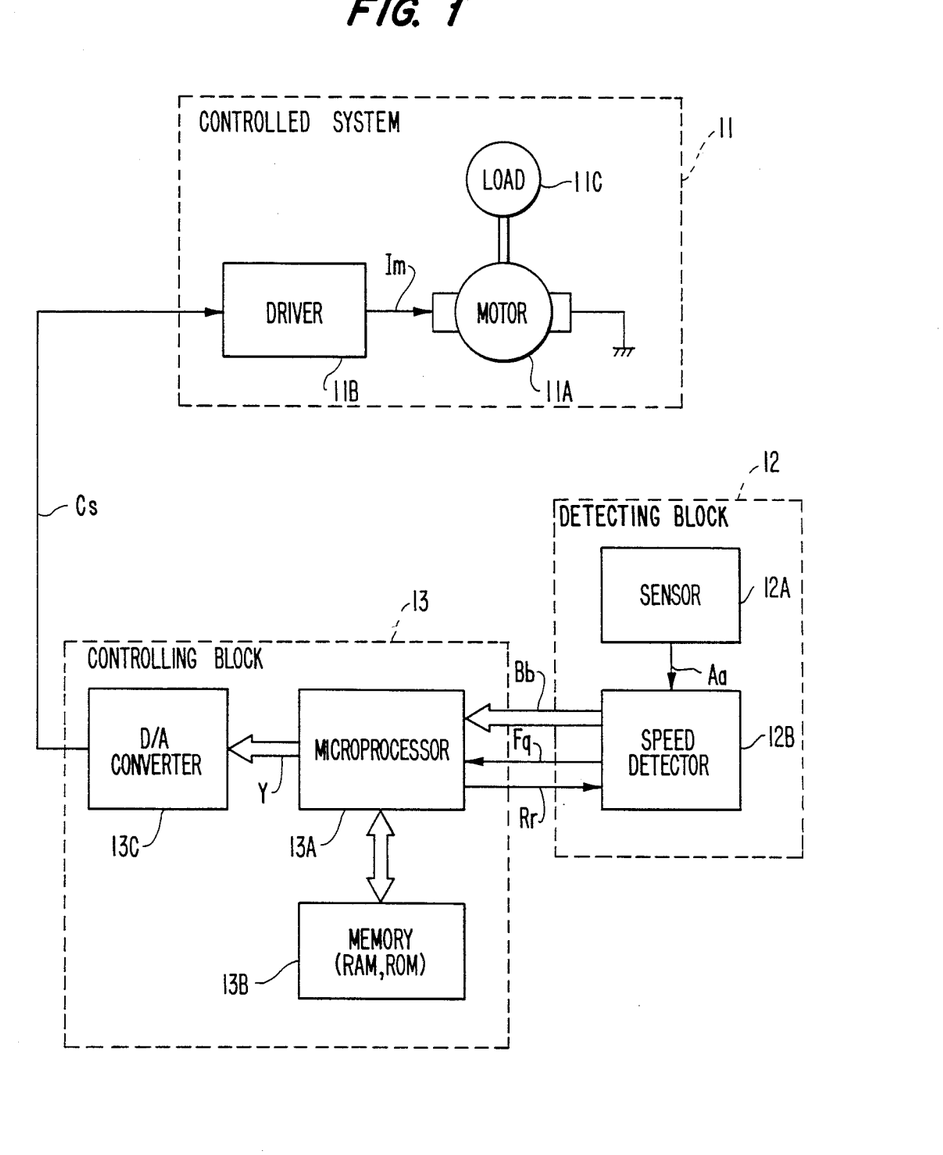
FIG. 1 is a basic block diagram of a control system for controlling the speed of a motor.

Referring now to FIG. 1, which shows a schematic construction of an embodiment of the present invention, a controlled system 11 has a DC motor 11A to be controlled and a driver 11B (a driving means) supplying the DC motor 11A with a current Im (a power). The DC motor 11A is controlled so as to rotate a load 11C (a torque disturbance source) at a desired speed. A detecting block 12 (a detecting means) has a sensor 12A (a sensing means) and a speed detector 12B (a speed detecting means). The sensor 12A produces a sensed signal Aa with a frequency equal to Zq times the rotational frequency fm [Hz] of the DC motor 11A, where Zq is an integer at least equal to 2. For example, Zq is equal to 357, in the case of a capstan motor of a video tape recorder. The speed detector 12B obtains a detected signal Bb and a flag signal Fq at every one or half period of the sensed signal Aa. The detected signal Bb is a digital or coded signal with a digital value corresponding to the one or half period of the sensed signal Aa, that is, the speed of the DC motor 11A. The flag signal Fq is set to be "H" (a high voltage) every time that the speed detector 12B obtains a new detected code or value. The detailed construction and operation of the speed detector 12B will be described later. A controlling block 13 (a controlling means) has a microprocessor 13A, a memory 13B including a RAM (random access memory) and a ROM (read only memory), and a D/A converter 13C. The microprocessor 13A executes an operation according to the instructions stored in the ROM of the memory 13B, so that the controlling block 13 inputs the detected signal Bb and supplies the driver 11B of the controlled system 11 with a control signal Cs corresponding to the detected signal Bb. The detailed operation of the microprocessor 13A will be described later. The driver 11B supplies the DC motor 11A with the current Im corresponding to the control signal Cs so as to generate a generated torque proportional to the control signal Cs.

Thus, a control loop (a speed control loop of the DC motor 11A) is formed by the controlled system 11 (the DC motor 11A and the driver 12B), the detecting block 12 (the sensor 12A and the speed detector 12B) and the controlling block 13 (the microprocessor 13A, the memory 13B and the D/A converter 13C), so that the controlled variable of the controlled system 11 (the speed of the DC motor 11A) is controlled so as to be at its desired value (the desired speed).

Figure 2:
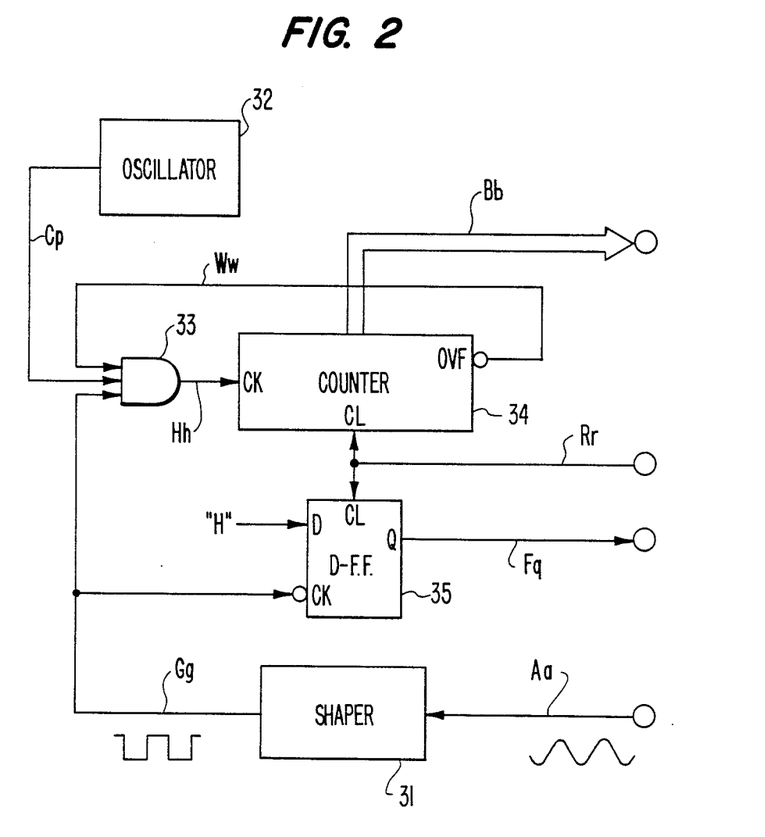
FIG. 2 is a circuit diagram of a speed detector usable in the control system shown in FIG. 1.

A construction of the speed detector 12B will be explained in detail hereinbelow. FIG. 2 shows a construction of the speed detector 12B. A shaper 31 compares the sensed signal Aa with a predetermined voltage and produces a shaped signal Gg with a squared waveform. The shaped signal Gg is applied to an input terminal of an AND circuit 33 and to a trigger input terminal CK of a D-type flip-flop 35. A clock pulse signal Cp of an oscillator 32 and an overflow signal Ww of a counter 34 are respectively applied to the other input terminals of the AND circuit 33. The oscillator 32 has a crystal oscillating element and a frequency divider, for example, and it produces the clock pulse signal Cp with a frequency of about 500 kHz, which is much higher than the frequency of the shaped signal Gg. The counter 34 has a 12 bit length and it counts up the output pulses Hh of the AND circuit 33. The overflow signal Ww of the counter 34 is an "H" when the content of the counter 34 remains below a predetermined value, and the overflow signal Ww is an "L" when the content of the counter 34 becomes equal to or over the predetermined value, where "H" and "L" means a high voltage (5 V) and a low voltage (0 V), respectively. Since the data input terminal of the D-type flip-flop 35 is connected to an "H" level, the flag signal Fq, which is the output signal of the D-type flip-flop 35, becomes an "H" at every falling edge of the shaped signal Gg. A reset signal Rr of the controlling block 13 can reset the contents of the counter 34 and the D-type flip-flop 35, so that Bb="LLLL LLLL LLLL" and Fq="L".

The operation of the speed detector 12B of FIG. 2 will be explained hereinbelow. Assuming that the contents of the counter 34 and the D-type flip-flop 35 are reset or at initial conditions and that the shaped signal Gg is an "L". After the shaped signal Gg changes from "L" to "H", the counter 34 counts up the output pulses Hh of the AND circuit 33 which is the clock pulse signal Cp of the oscillator 32. At the time when the shaped signal Gg changes from an "H" to an "L", the output signal Hh of the AND circuit 33 becomes an "L" and the counter 34 holds the content until the next change of the shaped signal Gg. As result of this, the held content of the counter 34 is a digital or coded value proportional to the half period of the sensed signal Aa of the sensor 12A, which is inversely proportional to the speed of the DC motor 11A. The flag signal Fq changes from "L" to "H" at a falling edge of the shaped signal Gg. The controlling block 13 inputs the detected signal Bb, which is the held content of the counter 34, after checking that the flag signal Fq is an "H". Then, the controlling block 13 resets the contents of the counter 34 and the D-type flip-flop 35 by making the reset signal Rr an "H" for a short time. This sets the counter 34 and the D-type flip-flop 35 at their initial conditions for preparing for the next detection. Besides, the held content of the counter 34 can be a large value, when the speed of the DC motor 11A is very low during the accelerating time.

The operation of the controlling block 13 will be explained in detail hereinbelow, referring to FIG. 3 which shows a flow diagram of the operation of the microprocessor 13A. It is noted that a register name and a content stored in it are designated by a same label hereinbelow. The microprocessor 13A executes the following tasks according to the instructions stored in the ROM of the memory 13B:

[AN ERROR BLOCK 3A (AN ERROR MEANS)]

(3A-1) The flag signal Fq is checked until the flag signal Fq becomes an "H". That is, the microprocessor 13A is triggered so as to excute the following procedure at the time that the speed detector 12B obtains a new detected code corresponding to the current speed of the DC motor 11A.

(3A-2) The detected signal Bb, which is the held content of the counter 34, is inputted and changed to a digital or coded value S. Then, the contents of the counter 34 and the D-type filp-flop 35 are reset by making the reset signal Rr an "H" for a very short time.

(3A-3) A difference value Eo is computed between the detected value S and a predetermined value Sref corresponding to the desired speed. That is, $Eo = Sref - S$. Then, an error signal E is obtained by multiplying the difference value Eo by a predetermined positive value R. That is, $E = REo$.

[AN OUTPUT BLOCK 3B (AN OUTPUT MEANS)]

(3B-1) An output signal Y is obtained by mixing the error signal E and a composite value V of a composing block 3Cb in a storage block 3C, described later, with a ratio of 1:D, where D is a positive real at most equal to 1.5 and at least equal to 0.25.

(3B-2) The output signal Y is outputted to the D/A converter 13C as the control signal Cs of the controlling block 13.

[A STORAGE BLOCK 3C (A STORAGE MEANS)]

The storage block 3C comprises a renewing block 3Ca and the composing block 3Cb.

<A RENEWING BLOCK 3Ca (A RENEWING MEANS)>

(3Ca-1) A count variable I is incremented with a modulo number NL, where N and L are integers at least equal to 2 and preferably L is equal to an integral multiple of Zq. That is, 'I = I + 1 (MOD NL)' means 'I = I + 1 and I = 0 if I = NL', because A with modula B means the remainder of A/B. Thus, the count variable I varies from 0 to NL−1 and increments the number in a circular form at every detecting timing of the speed detector 12B.

(3Ca-2) A stored value M[I], stored at the address corresponding to the count variable I in the RAM of the memory 13B, is renewed by a mixed value of the error signal E and the composite value V of the composing block 3Cb with a ratio of 1:1. That is, $M[I] = E + V$. The renewed stored value M[I] is held until the next renewing time M[I], that is, the NL renewing cycles later. As the result of this, the NL stored values M[0] to M[NL−1] are obtained, and the NL stored values are sequentially and periodically renewed.

<A COMPOSING BLOCK 3Cb (A COMPOSING MEANS)>

(3Cb-1) An operation of 'J = I + 1 (MOD NL)' is executed to obtain an integer J proceeding the count variable I by 1.

(3Cb-2) The composite value V of the composing block 3Cb is computed by combining linearly a set of N stored values $M[J-nL \text{ (MOD NL)}]$ $(n=1,2,\ldots,N)$ with positive coefficients $Wn$ $(n=1,2,\ldots,N)$ from $n=1$ to $n=N$, where the N stored values $M[J-nL \text{ (MOD NL)}]$ $(n=1,2,\ldots,N)$ have been renewed at intervals of L renewing cycles. That is, $$V = \sum_{n=1}^{N} Wn \, M(J - nL \, (MOD \, NL)) \tag{1}$$

where $$0 < Wn < 2/N \, (n = 1,2,\ldots,N) \tag{2}$$

$$\sum_{n=1}^{N} Wn = 1 \tag{3}$$

Preferably, $$Wn = 1/N \, (n=1,2,\ldots,N) \tag{4}$$

so as to make the computation of the composite value V easier. Notice that the composite value V of Eq. (1), computed here, will be used in the output block 3B and the renewing block 3Ca at the next detected timing. So, the composing block 3Cb computes the composite value V for future use, and the count variable I at the next detected timing will be equal to J at this timing. After the computation of the conposite value V of Eq. (1), the operation of the microprocessor 13A goes back to the task of the error block 3A.

The control system of the embodiment of the present invention shown by the combination of FIG. 1, FIG. 2 and FIG. 3 has a remarkably improved robustness to disturbances, which will be explained in detail hereinbelow. FIG. 4 shows a control block diagram of this embodiment. The controlled system 11 comprises the driver block 51 having the gain Ba of the driver 11B, the torque constant block 52 having the torque constant Kt of the DC motor 11A, the mixing point block 53 subtracting a load torque Td of the load 11C (a torque disturbance) from a generated torque Tm of the DC motor 11A, and the inertia block 54 having a transfer function of Ki/(Jm s), where Jm is the composed inertia of the DC motor 11A and the load 11C, Ki is a constant and 1/s is the Laplace integral operator. The speed fm of the DC motor 11A in the controlled system 11 is detected by the detecting block 12 having a gain Kv. The controlling block 13 comprises the error block 3A, the output block 3B and the storage block 3C having the renewing block 3Ca and the composing block 3Cb. The error block 3A has the mixing point block 61, for obtaining the difference value Eo between the detected value S and the predetermined value Sref, and the proportional gain block 62 having a gain of R. The output block 3B has a gain of block 71 having the gain D and the mixing point block 72 for adding the error signal E and the composite value V of the storage block 3C. The output block 3B supplies the driver block 51 of the controlled system 11 with the output signal Y as the control signal Cc. The renewing block 3Ca in the storage block 3C renews one of the stored values, M[I], with a mixed value of the error signal E and the composite value V of the composing block 3Cb. The composing block 3Cb computes the composite value V, which is a linear combination of a set of N stored values having been renewed at intervals L renewing cycles with the positive coefficients $Wn$ $(n=1,2,\ldots,N)$. In FIG. 4, $z^{-1}$ means a time delay of one renewing or sampling cycle period Tx. That is, $$z^{-1} = \exp(-sTx) \tag{5}$$

Figure 5:
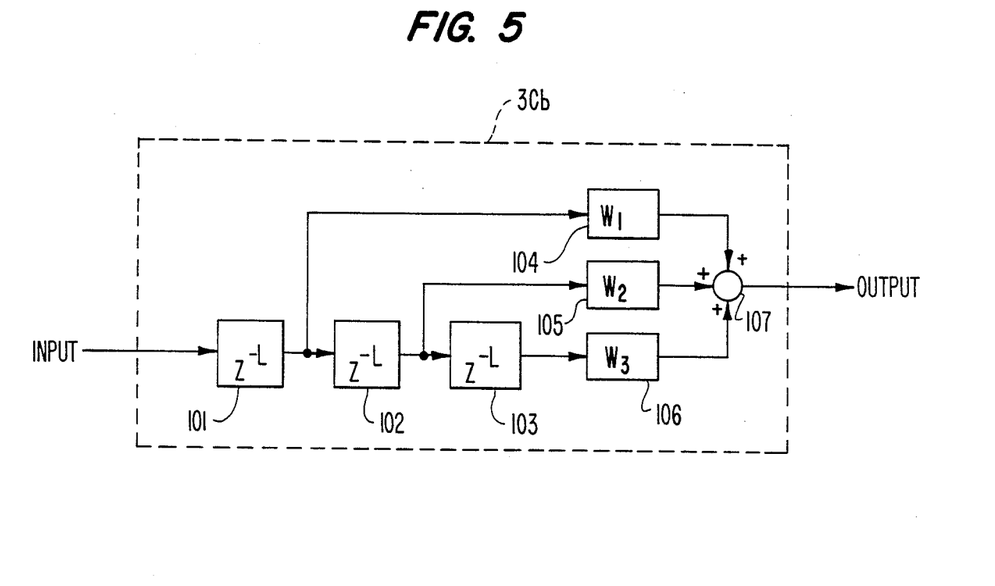
FIG. 5 is a block diagram showing an example of a transfer function of the composing means used in FIG. 3 with the relationship $N=3$.

The detailed block diagram of the composing block 3Cb with the relationship N=3 is shown in FIG. 5, for example. In FIG. 5, the transfer function of the composing block 3Cb has a series of three delay elements 101, 102 and 103 and produces an output signal (a composite value) by combining linearly the output signals of the three delay elements 101, 102 and 103 with the coefficients W1, W2 and W3, respectively, where each of the three delay elements 101, 102 and 103 delays for a time of L renewing or sampling cycles. Thus, the storage block 3C in the controlling block 13 has a positive feedback loop at a bypass from the error signal E to the control signal Cc, and the positive loop includes serially a transfer function which has a series of N delay elements and produces an output signal (a composite value) by combining linearly the output signals of the N delay elements with the positive coefficients $Wn$ $(n=1,2,\ldots,N)$, where each of the N delay elements delays for the time of L renewing or sampling cycles. The controlling block 13 supplies the driving block 51 of the controlled system 11 with the control signal Cc, and the DC motor 11A generates the generated torque Tm proportional to the control signal Cc.

The robustness to disturbances in the control system of this embodiment is represented by the transfer function from the torque disturbance Td to the speed fm of the DC motor 11A, which is $$Gx(s) = -\frac{fm}{td} = \frac{Ki/(Jm\,s)}{1 + (Kv\,R\,Ba\,Kt\,Kj)/\{Jm\,s\,H(s)\}} \tag{6}$$

where $$H(s) = \frac{1 - \sum_{n=1}^{N} Wn\,z^{-nL}}{1 - (1-D)\left(\sum_{n=1}^{N} Wn\,z^{-nL}\right)} \tag{7}$$

The frequency transfer function $Gx(j\omega)$ of Eq. (6) with the relationship $s=j\omega$ is approximated as the following equation in a lower part of the controlled frequency region:

$$Gx(j\omega) = Go(j\omega)H(J\omega) \tag{8}$$

where $$Go(j\omega) = 1/(Kv\,R\,Ba\,Kt\,Ki) \tag{9}$$

The frequency transfer function $Go(j\omega)$ represents the conventional robustness to disturbances of the conventional control system having no storage block 3C. Eq. (8) means that the present robustness to disturbance $Gx(j\omega)$ of the embodiment according to the present invention is a multiple of the frequency transfer function $H(j\omega)$ and the conventional robustness to disturbance $Go(j\omega)$ in a lower frequency region.

Figure 6:
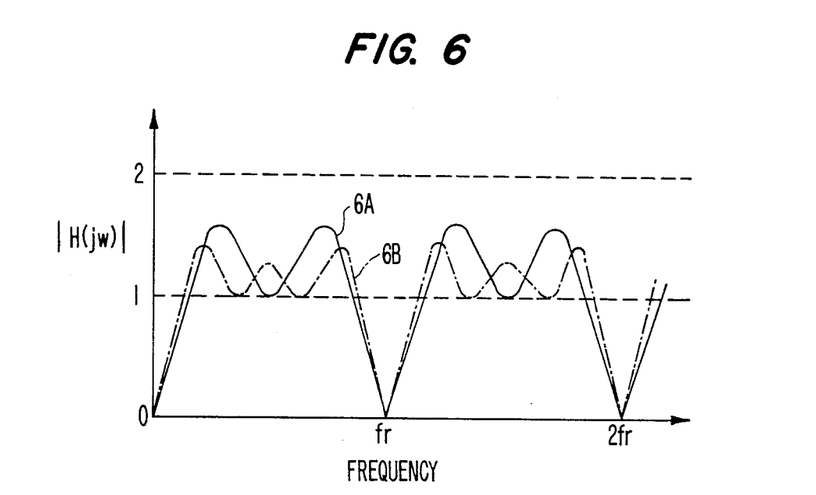
FIG. 6 shows two amplitude-frequency characteristics for explaining the advantages of the present invention.

Two examples of the amplitude-frequency characteristics of $H(j\omega)$ are shown in FIG. 6. The amplitude-frequency characteristics 6A and 6B in FIG. 6 correspond to the cases of (N=2, W1=0.5, W2=0.5, D=1) and (N=3, W1=0.33333, W2=0.33333, W3=0.33333, D=1), respectively. Each of the amplitude-frequency characteristics 6A and 6B is a function of the frequency with a period fr, where $$fr = 1/(L\ Tx) \quad (10)$$

Notice that the amplitudes of $H(j\omega)$ are equal to 0 at the frequencies kfr (k=0,1,2,...). As the result of this, the amplitudes of $Gx(j\omega)$ are also equal to 0 at those frequencies. The amplitude of $H(j\omega)$ at another frequency is equal to or almost equal to 1, which means that the amplitude of $Gx(j\omega)$ is equal to or almost equal to the amplitude of $Go(j\omega)$. Thus, the control system of the embodiment of the present invention has a remarkably improved robustness to torque disturbances, especially at the frequencies kfr (k=0,1,2,...).

In the case of the control system for controlling the speed of the motor explained hereinbefore, it is preferable that the time of L renewing cycles is equal to an integral multiple of one revolutional period of the motor. That is, $$LTx = K/fm \quad (11)$$

or $$fr = fm/K \quad (12)$$

where K is a positive integer. The reason for this is that the control system for controlling the speed of a motor has many harmonic components of the torque disturbances synchronized with the motor speed fm, but those harmonic components of the torque disturbances have little influences on the motor speed fm of the embodiment of the present control system with the relationship Eq. (11) or Eq. (12).

Figure 7:
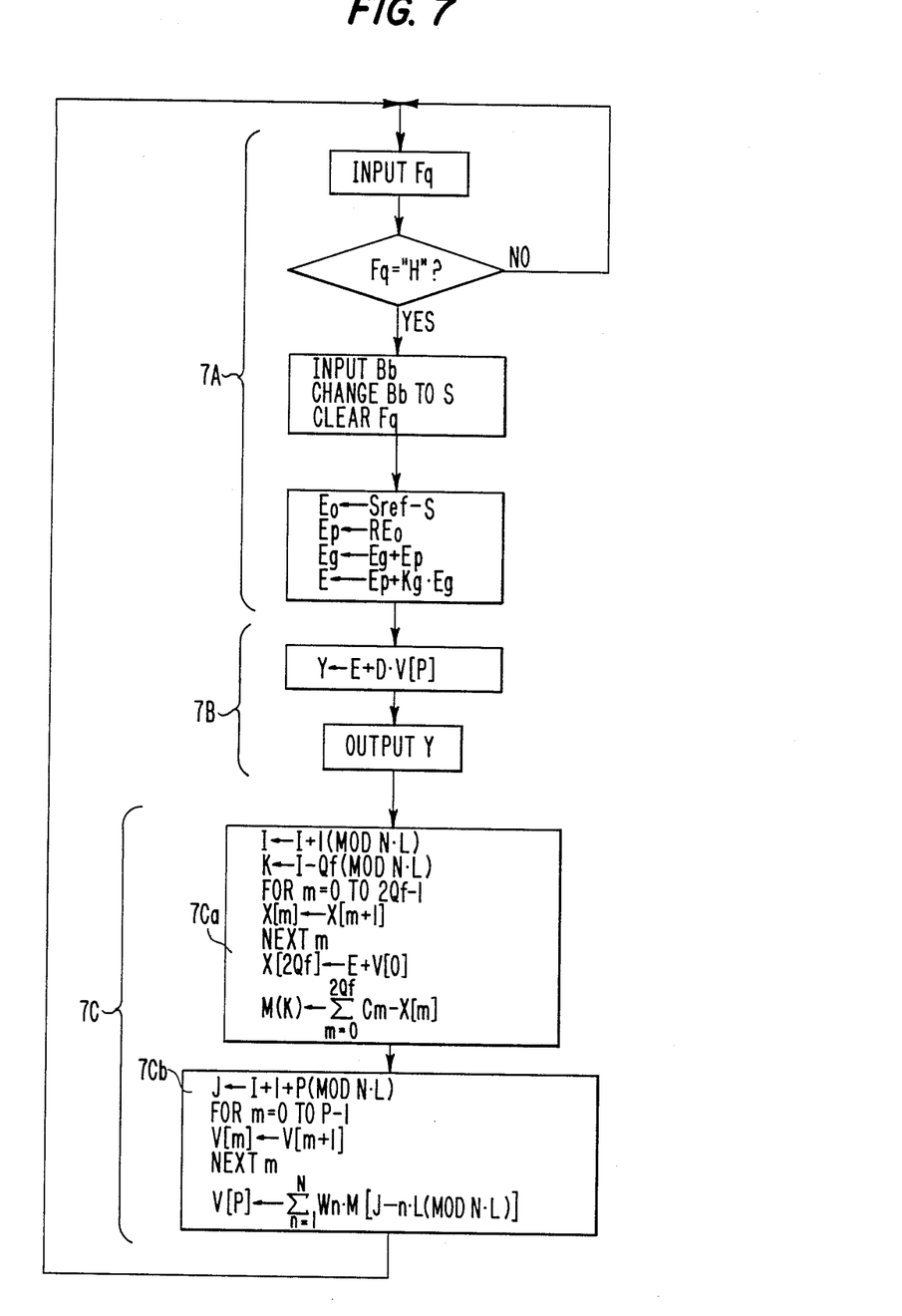
FIG. 7 is another flow diagram of the operation of the microprocessor which represents another embodiment of a control system according to the present invention with the combination of FIG. 1, FIG. 2 and FIG. 7.

FIG. 7 shows another flow diagram of the operation of the microprocessor 13A in the controlling block 13, which represents another embodiment of the present invention by the combination of FIG. 1, FIG. 2 and FIG. 7. The flow diagram of FIG. 7 will be explained hereinbelow.

[AN ERROR BLOCK 7A (AN ERROR MEANS)]

(7A-1) The flag signal Fq is checked until the flag signal Fq becomes "H". That is, the microprocessor 13A is triggered so as to execute the following procedure at the time that the speed detector 12B obtains a new detected code corresponding to the current speed of the DC motor 11A.

(7A-2) The detected signal Bb, the held content of the counter 34, is inputted and changed to the digital or coded value S. Then, the contents of the counter 34 and the D-type flip-flop 35 are reset by making the reset signal Rr an "H" for a very short time.

(7A-3) A difference value Eo is computed between the detected value S and a predetermined value Sref corresponding to the desired speed. That is, Eo=Sref−S.

(7A-4) A proportional value Ep is obtained by multiplying the difference value Eo by a predetermined positive value R. That is, Ep=REo. An integral value Eg is obtained by adding the old Eg and the proportional value Ep. That is, Eg=Eg+Ep. An error signal E is computed by mixing the proportional value Ep and the integral value Eg by a ratio of 1:Kg, where Kg is a positive constant. That is, E=Ep+KgEg. Thus, the error block 7A includes a proportional-integral filter means so that the error signal E has not only the proportional part but also the integral part of the difference value Eo.

[AN OUTPUT BLOCK 7B (AN OUTPUT MEANS)]

(7B-1) An output signal Y is obtained by mixing the error signal E and a composite value V[P] of a composing block 7Cb in a storage block 7C, described later, with a ratio of 1:D, where D is a positive real number which is at most equal to 1.5 and at least equal to 0.25.

(7B-2) The output signal Y is outputted to the D/A converter 13C as the control signal Cs of the controlling block 13.

[A STORAGE BLOCK 7C (A STORAGE MEANS)]

The storage block 7C comprises a renewing block 7Ca and the composing block 7Cb.

<A RENEWING BLOCK 7Ca (A RENEWING MEANS)>

(7Ca-1) A count variable I is incremented with a modulo number NL, where N and L are integers at least equal to 2 and preferably L is equal to an integral multiple of Zq. That is, 'I=I+1 (MOD NL)' means 'I=I+1 and I=0 if I=NL'. Thus, the count variable I varies from 0 to NL−1 and increments the number in a circular form at every detecting timing of the speed detector 12B.

(7Ca-2) An integer K is computed by subtracting an integer Qf from the count variable I with the modulo number NL, where Qf is an integer at least equal to 2 and preferably Qf=3.

(7Ca-3) A set of registers X[m] (m=0, 1, 2, ..., 2Qf) are used to compute a renewing value. The content of the register X[m+1] is transferred to the register X[m] sequentially from m=0 to m=2Qf−1. The content of the register X[2Qf] is changed by a mixed value of the error signal E of the error block 7A and a composite value V[0] of the composing block 7Cb with a ratio of 1:1. That is, X[2Qf]=E+V[0]. As the result of this, 2Qf+1 of the mixed values (E+V[0]), sequential with respect to the timings obtained, are stored in those registers X[m] (m=0,1,2,...,2Qf).

(7Ca-4) A stored value M[K], stored at the address corresponding to the integer K in the RAM of the memory 13B, is renewed by a linear combination of the mixed values stored in the registers X[m] (m=0,1,2,...,2Qf) with positive coefficients Cm (m=0,1,2,...,2Qf). That is, $$M(K) = \sum_{m=0}^{2Qf} Cm\ X(m) \quad (13)$$

where the coefficients Cm have the following relationships:

$$C_m = C_{2Qf-m}\ (m = 0,1,\ldots,Qf) \quad (14)$$

$$\sum_{m=0}^{2Qf} Cm = 1 \quad (15)$$

The renewed stored value M[K] is held until the next renewing time of M[K], that is the NL renewing cycles later. As the result of this, the NL stored values M[0] to M[NL−1] are obtained, and the NL stored values are sequentially and periodically renewed.

<A COMPOSING BLOCK 7Cb (A COMPOSING MEANS)>

(7Cb-1) An operation of 'J=I+1+P (MOD NL)' is executed to obtain an integer J proceeding the count variable I by $P+1$, where P is an integer at most equal to 5 and at least equal to 1, and preferably $P=3$.

(7Cb-2) Another set of registers $V[m]$ $(m=0,1,\ldots,P)$ are used to store composite values. The content of the register $V[m+1]$ is transferred to the register $V[m]$ from $m=0$ to $m=P-1$.

(7Cb-3) The newest composite value $V[P]$ is computed by combining linearly a set of N stored values $M[J-nL \text{ (MOD NL)}]$ $(n=1,2,\ldots,N)$ with positive coefficients Wn $(n=1,2,\ldots,N)$ from $n=1$ to $n=N$, where the N stored values $M[J-nL \text{ (MOD NL)}]$ $(n=1,2,\ldots,N)$ have been renewed at intervals of L renewing cycles. That is, $$V(P) = \sum_{n=1}^{N} Wn \, M(J - nL \text{ (MOD NL)}) \quad (16)$$

where the coefficients Wn $(n=1,2,\ldots,N)$ have the same relationships of Eq. (2) to Eq. (4). As the result of this, a plurality of the composite values $V[m]$ $(m=0,1,\ldots,P)$, sequential with respect to the timings, are obtained. Notice that $V[0]$ is the oldest composite value for using in the renewing block 7Ca at the next renewing timing, $V[P]$ is the newest composite value for using in the output block 7B at the next timing, and $V[P]$ and $V[0]$ have an interval of P periods. So, the composing block 7Cb computes the composite values $V[m]$ $(m=0,1,\ldots,P)$ for future use. After the computation of the composite values $V[m]$ $(m=0,1,\ldots,P)$, the operation of the microprocessor 13A goes back to the task of the error block 7A.

Figure 3:
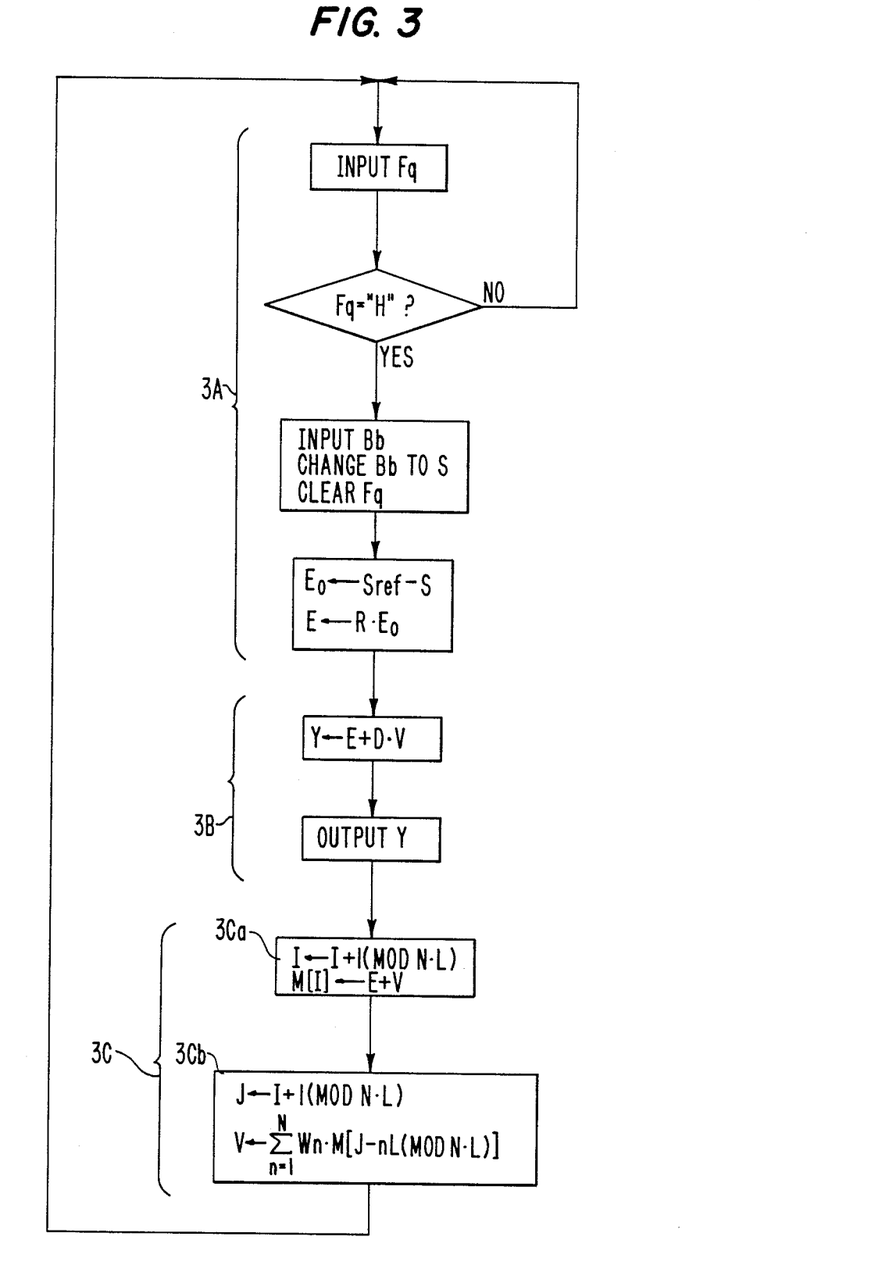
FIG. 3 is a flow diagram of the operation of the microprocessor which represents an embodiment of a control system according to the present invention with the combination of FIG. 1, FIG. 2 and FIG. 3.
Figure 4:
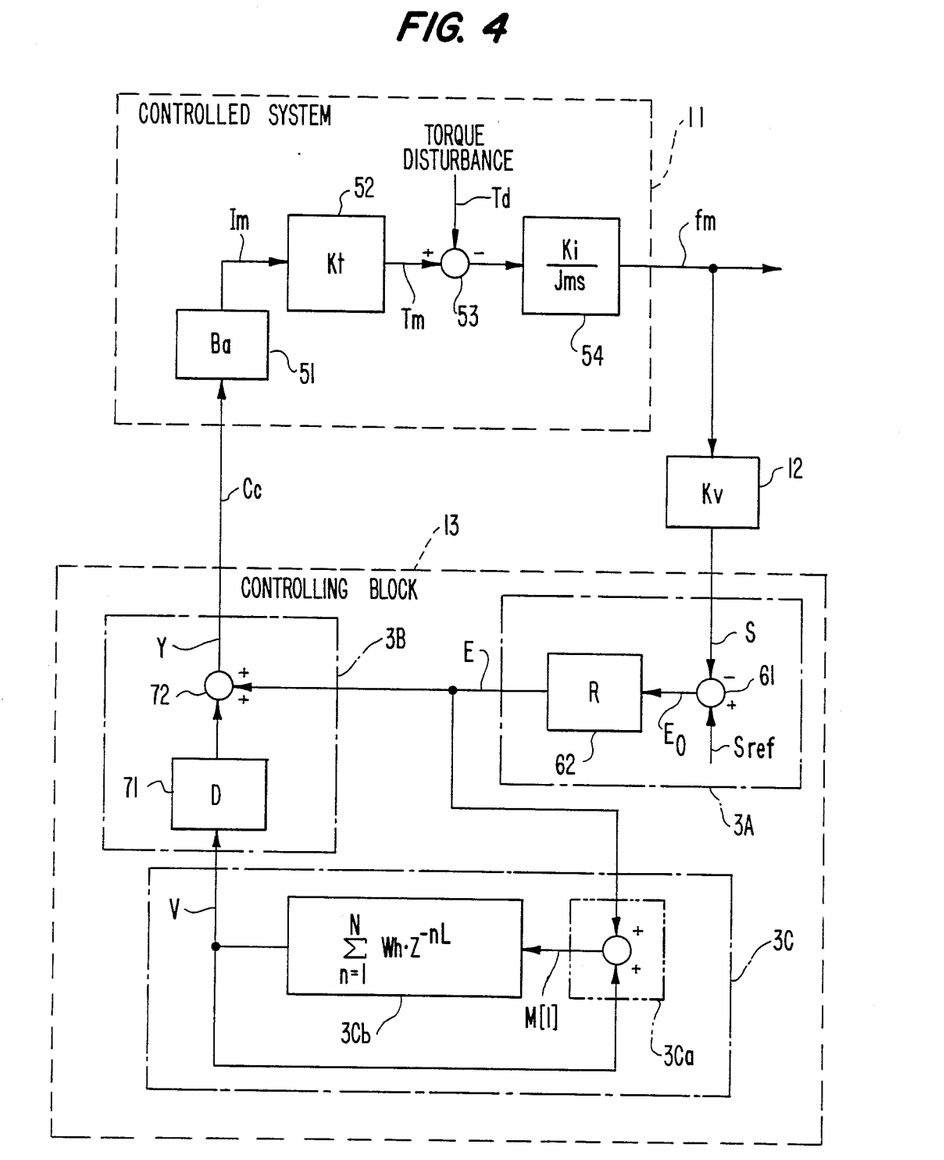
FIG. 4 is a control block diagram of the embodiment of the present invention shown by the combination of FIG. 1, FIG. 2 and FIG. 3.

The embodiment of the present invention by the combination of FIG. 1, FIG. 2 and FIG. 7 further has the following advantages;

(1) The robustness to disturbances of this embodiment is more improved than that of the embodiment shown by the combination of FIG. 1, FIG. 2 and FIG. 3, because the error block 7A includes a proportional-integral filter means.

(2) The control system of this embodiment has successfully stabilized even if the error block 7A includes a proportional-integral filter means, for the sake of the improvements of the renewing block 7Ca and the composing block 7Cb.

Figure 9:
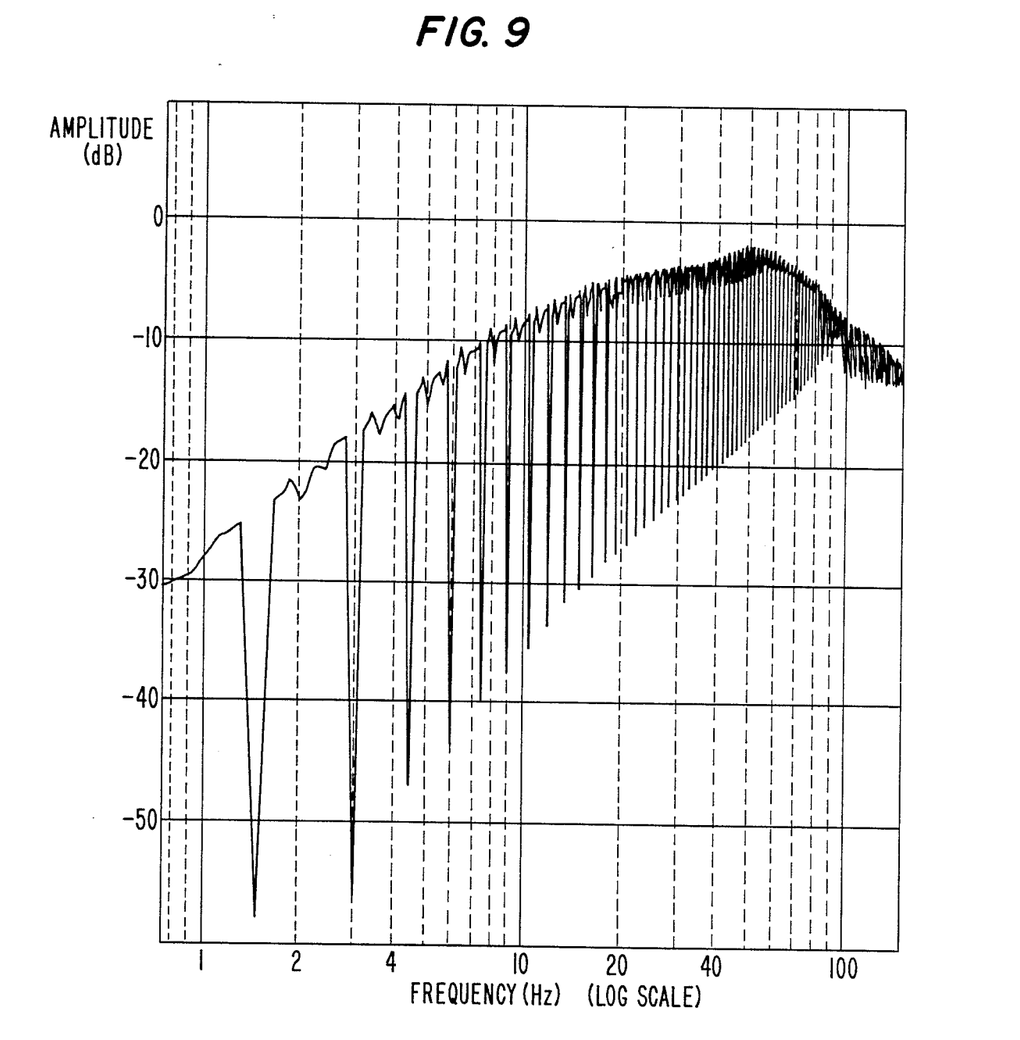
FIG. 9 shows an amplitude-frequency characteristics of an experimental result which represents a robustness to torque disturbances of an embodiment according to the present invention.

These advantages are well recognized by the experimental result of FIG. 9, which is the amplitude-frequency characteristics of a frequency transfer function of this embodiment from a current disturbance added in the current Im of the driver 11B to the speed fm of the DC motor 11A. The amplitude-frequency characteristics of FIG. 9 shows good robustness to disturbances in a lower part of the controlled frequency region, in particular, remarkably improved robustness to disturbances at the frequencies equal to an integral multiple of 1.5 Hz (equal to the speed of the DC motor 11A: $fm=1.5$ [Hz]). It shows no unstable peak at all.

Figure 8:
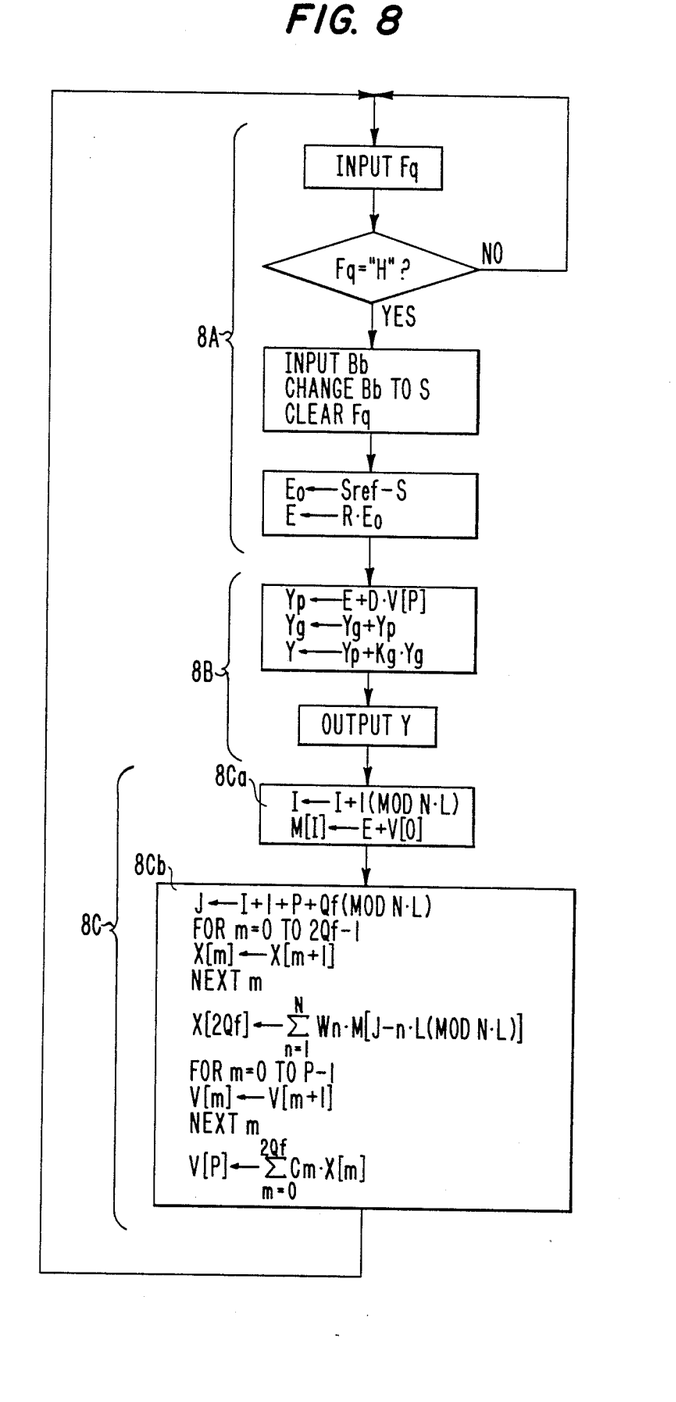
FIG. 8 is still another flow diagram of the operation of the microprocessor which represents still another embodiment of a control system according to the present invention with the combination of FIG. 1, FIG. 2 and FIG. 8.

FIG. 8 shows still another flow diagram of the operation of the microprocessor 13A in the controlling block 13, which represents still another embodiment of the present invention by the combination of FIG. 1, FIG. 2 and FIG. 8. The flow diagram of FIG. 8 is explained hereinbelow.

[AN ERROR BLOCK 8A (AN ERROR MEANS)]

(8A-1) The flag signal Fq is checked until the flag signal Fq becomes an "H". That is, the microprocessor 13A is triggered so as to executed the following procedure at the time that the speed detector 12B obtains a new detected code corresponding to the current speed of the DC motor 11A.

(8A-2) The detected signal Bb, which is the held contents of the counter 34, is inputted and changed to the digital or coded value S. Then, the contents of the counter 34 and the D-type flip-flop 35 are reset by making the reset signal Rr an "H" for a very short time.

(8A-3) The difference value Eo is computed between the detected value S and a predetermined value Sref corresponding to the desired speed. That is, $Eo = Sref - S$. Then, an error signal E is obtained by multiplying the difference value Eo by a predetermined positive value R. That is, $E = REo$.

[AN OUTPUT BLOCK 8B (AN OUTPUT MEANS)]

(8B-1) A proportional value Yp is obtained by mixing the error signal E and a composite value $V[P]$ of a composing block 8Cb in a storage block 8C, described later, with a ratio of 1:D, where D is a positive real number which is at most equal to 1.5 and at least equal to 0.25. An integral value Yg is computed by adding the old Yg and the proportional value Yp. That is, $Yg = Yg + Yp$. An output signal Y is computed by mixing the proportional value Yp and the integral value Yg with a ratio of 1:Kg, where Kg is a positive constant. That is, $Y = Yp + KgYg$.

(8B-2) The output signal Y is outputted to the D/A converter 13C as the control signal Cs of the controlling block 13. Thus, the output block 8B includes a proportional-integral filter means so that the output signal Y has not only the proportional part but also the integral part of the mixed value $(E+DV[P])$.

[A STORAGE BLOCK 8C (A STORAGE MEANS)]

The storage block 8C comprises a renewing block 8Ca and the composing block 8Cb.

<A RENEWING BLOCK 8Ca (A RENEWING MEANS)>

(8Ca-1) A count variable I is incremented with a modulo number NL, where each of N and L is an integer at least equal to 2 and preferably L is equal to an integral multiple of Zq. That is, '$I = I+1$ (MOD NL)' means '$I = I+1$ and $I=0$ if $I=NL$'. Thus, the count variable I varies from 0 to $NL-1$ and increments the number in a circular form at every detecting timing of the speed detector 12B.

(8Ca-2) A stored value $M[I]$, stored at the address corresponding to the count variable I in the RAM of the memory 13B, is renewed by a mixed value of the error signal E and a composite value $V[0]$ of the composing block 8Cb with a ratio of 1:1. That is, $M[I] = E + V[0]$. The renewed stored value $M[I]$ is held until the next renewing time of $M[I]$, that is, the NL renewing cycles later. As the result of this, the NL stored values $M[0]$ to $M[NL-1]$ are obtained, and the NL storage values are sequentially and periodically renewed.

<A COMPOSING BLOCK 8Cb (A COMPOSING MEANS)>

(8Cb-1) An operation of '$J = I+1+P+Qf$ (MOD NL)' is executed to obtain an integer J proceeding the count variable I by $P+Qf+1$ is obtained, where P is an integer at most equal to 5 and at least equal to 1 and preferably $P=3$, and Qf is an integer at least equal to 2 and preferably $Qf=3$.

(8Cb-2) A set of register $X[m]$ $(m=0,1,2,\ldots,2Qf)$ are used to compute composite values. The content of the register $X[m+1]$ is transferred to the register $X[m]$ sequentially from $m=0$ to $m=2Qf-1$.

(8Cb-3) The content of the register $X[2Qf]$ is changed by a linear combination of a set of N stored values M[J−nL (MOD NL)] (n=1, 2, ..., N) with positive coefficients Wn (n=1, 2, ..., N) from n=1 to n=N, where the N stored values M[J−nL (MOD NL)] (n=1, 2, ..., N) have been renewed at intervals of L renewing cycles. That is, $$X(2Qf) = \sum_{n=1}^{N} Wn \, M(J - nL \, (MOD \, NL)) \quad (17)$$

where the coefficients Wn (n=1, 2, ..., N) have the same relationships of Eq. (2) to Eq. (4). As the result of this, a plurality of linear combinations X[m] (m=0, 1, ..., 2Qf), sequential with respect to the timings, are obtained.

(8Cb-4) Another set of registers V[m] (m=0, 1, ..., P) are used to store composite values. The content of the register V[m+1] is transferred to the register V[m] from m=0 to m=P−1.

(8Cb-5) The newest composite value V[P] of the composing block 8Cb is computed by combining linearly the linear combinations X[m] (m=0, 1, 2, ..., 2Qf) with positive coefficients Cm (m=0, 1, 2, ..., 2Qf). That is, $$V(P) = \sum_{m=1}^{2Qf} Cm \, X(m) \quad (18)$$

where the coefficients Cm have the relationships of Eq. (14) and Eq. (15). As the result of this, a plurality of composite values V[m] (m=0, 1, ..., P), sequential with respect to the timings, are obtained. Notice that V[0] is the oldest composite value for using in the renewing block 8Ca at the next renewing timing, V[P] is the newest composite value for using in the output block 8B at the next timing, and V[P] and V[0] have an interval of P periods. So, the composing block 8Cb computes the composite values V[m] (m=0, 1, ..., P) for future use. After the computation of the composite values V[m], the operation of the microprocessor 13A goes back to the task of the error block 8A.

The embodiment of the present invention by the combination of FIG. 1, FIG. 2 and FIG. 8 also has the following advantages;

(1) The robustness to disturbances of this embodiment is more improved than that of the embodiment shown by the combination of FIG. 1, FIG. 2 and FIG. 3, because the output block 8B includes a proportional-integral filter means.

(2) The control system of this embodiment has successfully stabilized even if the output block 8B includes a proportional-integral filter means, for the sake of the improvement of the composing block 8Cb.

In each of the above embodiments according to the present invention, it is very advantageous for improving the robustness to disturbances that the microprocessor 13A executes the task of the storage block in the rest time after finishing the tasks of the error block and the output block, because a computing time delay for obtaining a new value of the control signal with a new value of the detected signal can be minimized. The computing time delay is the essential factor to determine an overall control gain, and smaller computing time delay makes the overall control gain larger. In particular, it is very important for minimizing the computing time delay that the composing block in the storage block prepares one or more composite values for future use. Notice also that it is not so important to minimize a computing time for the task of the storage block, because the storage block can use the rest time of the one detecting period except for the computing time delay for the tasks of the error block and the output block.

Specific embodiments of the present invention have been described hereinabove with reference to the accompanying drawings, but it is to be understood that the invention is not limited to those precise embodiments, and that various changes and modifications may be effected therein by one skilled in the art without departing from the scope or spirit of the invention as defined in the appended claim. For example, the error signal can be a signal composed with a speed error and a phase error of a motor so as to control not only the speed but also the phase of the motor, when the control system for a motor has a phase detector as well as a speed detector.

What is claimed is:

1. A control system comprising:
   a detecting means for producing a detected signal indicative of a controlled variable of a controlled system;
   an error means for producing an error value from the detected signal;
   a storage means for storing therein a plurality of stored values and for renewing the plurality of stored values sequentially and periodically at substantially constant renewing intervals each by a renewing value having information of a first mixed value obtained by a means for mixing the error value with at least a set of N stored values of said plurality of stored values, said set of N stored values having been renewed at intervals of L renewing cycles, where N and L are integers at least equal to 2; and
   an output means for producing a control signal from a second mixed value obtained by a means for mixing the error value with one or more of said plurality of stored values, and for supplying said controlled system with the control signal so as to control the controlled variable of said controlled system.

2. A control system as claimed in claim 1, wherein said storage means comprises a means for computing periodically at least one linear combination of the set of N stored values with coefficients having a same sign to obtain the values mixed with the error value.

3. A control system as claimed in claim 2, wherein all of the coefficients are substantially equal.

4. A control system as claimed in claim 1, wherein said control system has a microprocessor for executing the tasks of said error means, said output means and said storage means, and said microprocessor executes the task of said storage means in the rest time after finishing the tasks of said error means and said output means.

5. A control system as claimed in claim 1, wherein said error means includes a proportional-integral filter disposed so that the error value has not only a proportional part but also an integral part of the detected signal.

6. A control system as claimed in claim 1, wherein said output means includes a proportional-integral filter disposed so that the control signal has not only a proportional part but also an integral part of the second mixed value.

7. A control system as claimed in claim 1, wherein said storage means comprises:

a composing means for producing one or more composite values periodically at said renewing intervals as the values mixed with the error value, each of the composite values being at least a linear combination of the set of N stored values; and a renewing means for renewing the stored values sequentially and periodically at said renewing intervals each by a renewing value having information of a mixed value obtained by mixing the error value with a composite value produced by said composing means.

8. A control system as claimed in claim 7, wherein said composing means comprises a means for computing periodically at least one linear combination of the set of n stored values with coefficients having a same sign to obtain each of said composite values.

9. A control system as claimed in claim 8, wherein all of the coefficients are substantially equal.

10. A control system as claimed in claim 9, wherein said renewing value is a linear combination of a set of the first mixed values sequential with respect to the timings obtained.

11. A control system as claimed in claim 7, wherein said output means comprises a means for obtaining the second mixed value by mixing the error value with at least one of said composite values.

12. A control system as claimed in claim 11, wherein the composite value mixed with the error value in said output means is newer than the composite value mixed with the error value in said renewing means.

13. A control system as claimed in claim 7, wherein said composing means computes each of the composite values by combining linearly a set of the linear combinations of the set of N stored values sequential with respect to the timings obtained.

14. A control system comprising:
a detecting means for producing a detected signal indicative of a controlled variable of a controlled system;
an error means for producing an error value from the detected signal;
a renewing means for storing therein a plurality of stored values and for renewing the plurality of stored values sequentially and periodically at substantially contant renewing intervals each by a renewing value having information of a first mixed value obtained by a means for mixing the error value with a composite value produced by a composing means;
said composing means producing one or more composite values at the renewing intervals, each of said composite values being at least a linear combination of a set of N stored values of said plurality of stored values, said set of N stored values having been renewed at intervals of L renewing cycles, where N and L are integers at least equal to 2; and
an output means for producing a control signal from a second mixed value obtained by a means for mixing the error value with at least one of said composite values, and supplying said controlled system with the control signal so as to control the controlled variable of said controlled system.

15. A control system comprising:
a detecting means for producing a detecting signal indicative of a controlled variable of a controlled system; and
a controlling means for producing a control signal from the detected signal and supplying said controlled system with the control signal so as to control the controlled variable of said controlled system;
wherein said controlling means comprises a positive feedback loop having an input signal having information of the detected signal and an output signal affecting the control signal; and
wherein said positive feedback loop includes serially a transfer function having a series of N delay elements and producing an output signal by combining linearly output signals of said N delay elements with coefficients having a same sign, each of said n delay elements delaying for a time of L sampling cycles, where N and L are integers at least equal to 2.

16. A control system for a motor comprising:
a motor to be controlled;
a driving means for supplying said motor with power according to a control signal;
a sensing means for producing a sensed signal with a frequency proportional to a speed of said motor;
a speed detecting means for obtaining a detected signal with a digital number indicative of the speed of said motor at intervals of a detecting period proportional to he period of the sensed signal;
an error means for producing an error value from the detected signal and including a proportional-integral filter means so that the error value has not only a proportional part but also an integral part of the detected signal;
a storage means for storing therein a plurality of stored values and for renewing the plurality of stored values sequentially and periodically at intervals of a renewing cycle period proportional to the detecting period of said speed detecting means each by a renewing value having information of a first mixed value obtained by a means for mixing the error value with one or more of said stored values which are at least an interval of L renewing cycle periods older, where L is an integer at least equal to 2; and
an output means for producing the control signal from a second mixed value obtained by a means for mixing the error value with one or more of said plurality of stored values, and for supplying said driving means with the control signal.

17. A control system as claimed in claim 16, wherein the interval of L renewing cycle periods in said storage means is equal to an integral multiple of one revolution period of said motor.

18. A control system as claimed in claim 16, wherein said control system has a microprocessor for executing the tasks of said error means, said output means and said storage means, and said microprocessor executes the task of said storage means in the rest time after finishing the tasks of said error means and said output means.

19. A control system as claimed in claim 16, wherein said storage means comprises:
a composing means for producing one or more composite values periodically at the intervals of the renewing cycle period as the values mixed with the error value, each of the composite values being at least a linear combination of a set of N stored values of said plurality of stored values having been renewed at intervals of the L renewing cycle periods, where N is an integer at least equal to 2; and
a renewing means for renewing the stored values sequentially and periodically at the intervals of the renewing cycle period each by a renewing value having information of a mixed value obtained by a means for mixing the error value with a composite value produced by said composing means.

20. A control system as claimed in claim 19, wherein said composing means comprises a means for computing periodically at least one linear combination of the set of N stored values with coefficients having a same sign to obtain each of said composite values.

21. A control system as claimed in claim 20, wherein all of the coefficients are substantially equal.

22. A control system as claimed in claim 19, wherein said renewing value is a linear combination of a set of the first mixed values sequential with respect to the timings obtained.

23. A control system as claimed in claim 19, wherein said output means comprises a means for obtaining the second mixed value by mixing the error value with at least one of said composite values.

24. A control system as claimed in claim 23, wherein the composite value mixed with the error value in said output means is newer than the composite value mixed with the error value in said renewing means.

25. A control system as claimed in claim 19, wherein said composing means comprises a means for computing each of the composite values by combining linearly a set of the linear combinations of the set of N stored values sequential with respect to the timings obtained.

26. A control system for a motor comprising:
   a motor to be controlled;
   a driving means for supplying said motor with power according to a control signal;
   a sensing means for producing a sensed signal with a frequency proportional to a speed of said motor;
   a speed detecting means for obtaining a detected signal with a digital number indicative of the speed of said motor at intervals of a detecting period proportional to the period of the sensed signal;
   an error means for producing an error value from the detected signal;
   a storage means for storing therein a plurality of stored values and for renewing the plurality of stored values sequentially and periodically at intervals of a renewing cycle period proportional to the detecting period of said speed detecting means each by a renewing value having information of a first mixed value obtained by a means for mixing the error value with one or more of said stored values which are at least an interval of L renewing cycle periods older, where L is an integer at least equal to 2; and
   an output means for producing the control signal from a second mixed value obtained by a means for mixing the error value with one or more of said plurality of stored values, including a proportional-integral filter means so that the control signal has not only a proportional part but also an integral part of the second mixed value, and supplying said driving means with the control signal.

27. A control system as claimed in claim 26, wherein the interval of L renewing cycle periods in said storage means is equal to an integral multiple of one revolution period of said motor.

28. A control system as claimed in claim 26, wherein said control system has a microprocessor for executing the tasks of said error means, said output means and said storage means, and said microprocessor executes the task of said storage means in the rest time after finishing the tasks of said error means and said output means.

29. A control system as claimed in claim 26, wherein said storage means comprises:
   a composing means for producing one or more composite values periodically at the intervals of the renewing cycle period, each of the composite values being at least a linear combination of a set of N stored values of said plurality of stored values having been renewed at intervals of 1 renewing cycle periods, where N is an integer at least equal to 2; and
   a renewing means for renewing the stored values sequentially and periodically at the intervals of the renewing cycle period each by a renewing value having information of a mixed value obtained by a means for mixing the error value with a composite value produced by said composing means.

30. A control system as claimed in claim 29, wherein said composing means comprises a means for computing periodically at least one linear combination of the set of N stored values with coefficients having a same sign to obtain each of said composite values.

31. A control system as claimed in claim 30, wherein all of the coefficients are substantially equal.

32. A control system as claimed in claim 29, wherein said renewing value is a linear combination of a set of the first mixed values sequential with respect to the timings obtained.

33. A control system as claimed in claim 29, wherein said output means comprises a means for obtaining the second mixed value by mixing the error value with at least one of said composite values.

34. A control system as claimed in claim 33, wherein the composite value mixed with the error value in said output means is newer than the composite value mixed with the error value in said renewing means.

35. A control system as claimed in claim 29, wherein said composing means comprises a means for computing each of the composite values by combining linearly a set of the liner combinations of the set of N stored values sequential with respect to the timings obtained.

36. A control system for a motor comprising:
   a motor to be controlled;
   a driving means for supplying said motor with power according to a control signal;
   a sensing means for producing a sensed signal with a frequency proportional to a speed of said motor;
   a speed detecting means for obtaining a detected signal with a digital number indicative of the speed of said motor at intervals of a detecting period proportional to the period of the sensed signal; and
   a controlling means for producing the control signal from the detected signal and for supplying said driving means with the control signal;
   wherein said controlling means comprises a positive feedback loop having an input signal having information of the detected signal and an output signal affecting the control signal of said controlling means; and
   wherein said positive feedback loop includes serially a transfer function having a series of N delay elements and producing an output signal by combining linearly output signals of said N delay elements with coefficients having a same sign, each of said N delay elements delaying for a time of L sampling cycle periods equal to an integral multiple of one revolutional period of said motor, where N and L are integers at least equal to 2.

* * * * *